2,923,610

AMMONIUM NITRATE COMPOSITIONS

Aubrey Edward Harper, Glasgow, Kenneth Harrison, Saltcoats, and Edward Graham Cooke, West Kilbride, Scotland, assignors to Imperial Chemical Industries Limited, London, England, a corporation of Great Britain No Drawing. Application March 12, 1957
Serial No. 645,641

Claims priority, application Great Britain April 21, 1956

4 Claims. (Cl. 52—.5)

This invention is concerned with new and improved gas-producing compositions and more particularly with such compositions capable of self-sustained non-detonating gas-producing reaction which are based on ammonium nitrate.

Ammonium nitrate gas-producing compositions consisting essentially of ammonium nitrate with an organic fuel and, if desired, a sensitiser, are well known and widely used for a variety of purposes such as driving engine starter motors, rocket motors and the like. In order that these compositions may burn at sufficiently high linear rates it is necessary generally to include in the composition as catalyst a small proportion of a chromium compound of which the most often employed is ammonium dichromate. It is frequently necessary, when for instance a high rate of burning, high specific impulse, or improvement in physical properties is required, to use a particular organic fuel, e.g. catechol, acetyl acetone, pyridine or quinoline. Many of these substances however suffer from various disadvantages such as, for example, thermal instability, especially in the presence of oxidising materials such as ammonium dichromate, or too low a melting point.

It has now been found that these difficulties can be overcome if ammonium nitrate compositions capable of self-sustained non-detonating gas-producing reaction include certain organic chromium complexes which perform the dual role of fuel and catalyst. Furthermore the use of these complexes enables a much wider group of organic materials to be utilised than was formerly thought possible.

According to the present invention a composition capable of self-sustained non-detonating gas-producing reaction comprises ammonium nitrate and up to 50% of an organic chromium compound which is solid and chemically stable below 100° C. and contains not less than 5% and not more than 20% by weight of chromium.

The organic chromium compound may be present in the gas-producing composition in amounts of the order 5% to 50% by weight so that the composition will contain from 0.25% to 10% by weight of chromium. It is preferred that the final composition should contain about 1% of chromium.

Suitable chromium containing compounds for the compositions of the invention are for example ammonium tricatechol chromate, pyridine tricatechol chromate, chromium acetylacetonate, pyridine dichromate and quinoline dichromate.

The gas-producing compositions of the invention may contain in addition to ammonium nitrate and the organic chromium compound other constituents such as potassium nitrate and china clay in amounts up to about 10% by weight of the composition.

The invention is illustrated by the following examples in which all parts are by weight.

Example 1

A pressed charge is made having the composition 87.64 parts of 9:1 ammonium nitrate/potassium nitrate mixture and 12.36 parts ammonium tricatechol chromate. The burning rate of the charge is 0.30 in./sec. at 500 lb./sq. in. In order to test the stability of the charge under vacuum a 5 g. sample is heated at 100° C. for 40 hours under vacuum when the amount of gas evolved is 0.1 ml. (at N.T.P.).

An equivalent composition containing catechol and ammonium dichromate instead of ammonium tricatechol chromate when tested for stability by heating under vacuum is found to be too unstable to be acceptable for practical applications.

Example 2

A pressed charge is made having the composition 81.85 parts of 9:1 ammonium nitrate/potassium nitrate mixture and 10.15 parts pyridine tricatechol chromate. The charge has a burning rate of 0.265 in./sec. at 500 lb./sq. in. When tested for stability in the manner described in Example 1, 0.3 ml. of gas is evolved (at N.T.P.).

Example 3

A pressed charge is made having the composition 88.37 parts 9:1 ammonium nitrate/potassium nitrate and 11.63 parts chromium acetylacetonate. The charge has a burning rate of 0.14 in./sec. and when tested for stability in the manner described in Example 1 evolves no gas. The melting point of chromium acetylacetonate is 214–215° C. Acetyl acetone on the other hand melts at −23° C. and is thus unsuitable for use in ammonium nitrate gas-producing charges.

Example 4

A pressed charge is made having the composition 73.45 parts 9:1 ammonium nitrate/potassium nitrate mixture and 26.55 parts pyridine dichromate. This charge has a burning rate of 0.14 in./sec. at 500 lb./sq. in. Pyridine dichromate has a melting point of about 195° C. (melting point of pyridine is −42° C.).

Example 5

A pressed charge is made having the composition 79.55 parts 9:1 ammonium nitrate/potassium nitrate mixture and 20.45 parts quinoline dichromate. This charge has a burning rate of 0.135 in./sec. at 500 lb./sq. in. Quinoline dichromate has a melting point of 165–167° C. (melting point of quinoline is −19.5° C.).

What we claim is:

1. A composition capable of self-sustained non-detonating gas-producing reaction consisting essentially of ammonium nitrate and from 5 to 50% of an organic chromium combustion catalyst selected from the group consisting of ammonium tricatechol chromate, pyridine tricatechol chromate, chromium acetylacetonate, pyridine dichromate and quinoline dichromate, and which is solid and chemically stable below 100° C. and contains not less than 5% and not more than 20% by weight of chromium.

2. A composition as claimed in claim 1 which contains about 1% of chromium by total weight of composition.

3. A composition as claimed in claim 1 which includes potassium nitrate up to 10% by weight of the composition.

4. A composition as claimed in claim 1 which includes china clay up to 10% by weight of the composition.

(References on following page)

References Cited in the file of this patent

UNITED STATES PATENTS

| | | |
|---|---|---|
| 2,159,234 | Taylor | May 23, 1939 |
| 2,555,333 | Grand et al. | June 5, 1951 |
| 2,637,274 | Taylor et al. | May 5, 1953 |
| 2,653,086 | Taylor et al. | Sept. 22, 1953 |
| 2,712,989 | Maisner | July 12, 1955 |
| 2,740,702 | Mace | Apr. 3, 1956 |

OTHER REFERENCES

Taylor, J., and Sillitto: "The Use of Ammonium Nitrate as a Solid Fuel to Provide Gas for Propulsive Purposes," 3rd Symposium on Combustion, Flame and Explosion Phenomena. Williams & Wilkins, Baltimore (1949), pages 572–9.